Patented Nov. 8, 1927.

1,648,231

UNITED STATES PATENT OFFICE.

OTTO HERMANN, OF CHICAGO, ILLINOIS, ASSIGNOR TO THERMO ELECTRIC BATTERY CO., OF CHICAGO, ILLINOIS, A CORPORATION OF ILLINOIS.

THERMOCOUPLE.

No Drawing. Application filed November 9, 1925, Serial No. 68,015. Renewed August 28, 1926.

The object of my invention is to provide a thermocouple, the elements of which possess the properties adapted to produce a larger quantity of electrical energy for a given quantity of heat absorbed at the hot junction of the thermocouple than is usually the case with this method of generating electric current.

One element of my thermocouple consists of a nickel-cobalt-copper alloy and the other element of a nickel-molybdenum alloy. The current in this thermocouple flows from the nickel-cobalt-copper alloy over the hot junction to the nickel-molybdenum alloy so that, in conformity with the rule generally applied, the former alloy is hereafter referred to as the positive element and the latter alloy as the negative element of the thermocouple.

From both the positive and the negative element material described above, I have produced a number of sample melts which varied from each other in the quantities of their component metallic elements. From these sample melts I have prepared thermo-elements and joined them together in the usual manner for thermocouples. Thus I have discovered that the best result, in accord with the object of my invention, is obtained when the positive element of the thermocouple is composed of 44% to 46% of nickel, 1% to 3% of cobalt and 53% of copper and the negative element of a nickel-molybdenum alloy containing from 83% to 83½% of nickel and from 16½% to 17% of molybdenum.

This thermocouple material, including the negative as well as the positive alloy, has been found to be ductile and can be drawn into wire and rolled into ribbon or sheet form. The element material is also well adapted to apply either the method of brazing or of electric welding for the connection of the elements into thermocouples. It has been observed that a spot welded joint of the thermocouple is not impaired when acted on by a source of heat having an excessive temperature.

The positive and also the negative element of my thermocouple resist oxidation at a fairly high temperature and at lower temperatures, up to a dull red heat, for a greatly extended period of time.

The thermocouple hereinbefore described has a relatively high efficiency. This is chiefly due to the comparatively high thermal electromotive force of this thermocouple and to the large electrical conductivities of the thermocouple elements compared with their small thermal conductivities. Another desirable property of both thermoelements (especially the positive element) is their low temperature coefficient; it has been evidenced by the results of measurements taken that the increase of their ohmic resistance with a rise of temperature is extremely small when compared with their initial resistance at ordinary temperatures.

I claim:

1. A thermocouple, the positive element of which consists of an alloy composed of 44% to 46% of nickel, 1% to 3% of cobalt and 53% of copper and the negative element of an alloy composed of 83% to 83½% of nickel and 16½% to 17% of molybdenum.

2. A thermocouple, the positive element of which consists of an alloy composed of 44% to 46% of nickel, 1% to 3% of cobalt and 53% of copper.

3. A thermocouple, the negative element of which consists of an alloy composed of 83% to 83½% of nickel and 16½% to 17% of molybdenum.

4. A thermo-electric couple having a negative element which includes nickel and molybdenum in its make-up, and having a positive element which includes nickel and cobalt in its make-up, the nickel being present in an amount not less than 44% of the total.

5. A thermo-electric couple having a negative element which includes nickel and molybdenum in its make-up, the nickel being present in an amount not less than 80% of the total, and having a positive element which includes nickel and cobalt in its make-up, the nickel being present in an amount not less than 44% of the total.

6. An alloy consisting of nickel, copper and cobalt.

7. A thermo-couple having a positive element consisting of a nickel-cobalt-copper alloy and a negative element consisting of a nickel-molybdenum alloy, said thermo-couple producing an average electro-motive force in excess of 85 micro-volts per centigrade degree difference of temperature, the elements thereof having a ratio of electrical to thermal conductance greater in value than .35.

8. A thermo-couple which produces an average electro-motive force in excess of 85 micro-volts per centigrade degree difference of temperature, the metallic elements thereof having a ratio of electrical to thermal conductance greater in value than .5.

9. A thermo-couple which produces an average electro-motive force in excess of 85 micro-volts per centigrade degree of difference of temperature, the positive element thereof consisting of a nickel-cobalt-copper alloy having a ratio of electrical to thermal conductance greater in value than .35.

10. A thermo-couple having a positive element composed of a ductile nickel alloy and a negative element composed of a ductile nickel alloy, said couple being capable of operating in a practical manner and during a useful life at temperatures as high as 600 degrees centigrade, the ratio of electrical to thermal conductance of said elements being such that at least 3 percent of the heat absorbed at the hot junction of said couple is converted into electrical energy.

11. A thermo-couple capable of operating in a practical manner and during a useful life at temperatures as high as 500 degrees centigrade and having elements capable of being welded together, said elements having a ratio of electrical to thermal conductivity such that at least 2 percent of the heat absorbed at its hot junction is converted into electrical energy available for use in an external circuit.

12. A thermo-couple having a positive element including nickel copper and cobalt in its make-up, the amount of copper being less than 60% of the total, and having a negative element including nickel and molybdenum in its make-up.

13. A thermo-couple having a positive element consisting of an alloy of nickel copper and cobalt, and having a negative element consisting of an alloy of nickel and molybdenum.

In testimony whereof I affix my signature.

OTTO HERMANN.